(12) United States Patent
Kurabuchi

(10) Patent No.: US 11,843,643 B2
(45) Date of Patent: Dec. 12, 2023

(54) INFORMATION PROCESSING SYSTEM, INFORMATION PROCESSING METHOD, AND COMPUTER PROGRAM

(71) Applicant: GREE, INC., Tokyo (JP)

(72) Inventor: Aya Kurabuchi, Tokyo (JP)

(73) Assignee: GREE, INC., Tokyo (JP)

(*) Notice: Subject to any disclaimer, the term of this patent is extended or adjusted under 35 U.S.C. 154(b) by 348 days.

(21) Appl. No.: 17/135,151

(22) Filed: Dec. 28, 2020

(65) Prior Publication Data

US 2021/0203702 A1 Jul. 1, 2021

(30) Foreign Application Priority Data

Dec. 27, 2019 (JP) ................. 2019-238429

(51) Int. Cl.
*H04L 65/403* (2022.01)

(52) U.S. Cl.
CPC .................. *H04L 65/403* (2013.01)

(58) Field of Classification Search
CPC ....... H04L 65/00–65/80; H04N 21/80–21/816; H04N 21/20–21/2187
See application file for complete search history.

(56) References Cited

U.S. PATENT DOCUMENTS

| 8,223,144 B2 | 7/2012 | Ishiwata et al. |
| 2017/0243239 A1* | 8/2017 | El-Eid ................ G06Q 30/0208 |
| 2017/0309051 A1 | 10/2017 | Yamasaki et al. |
| 2018/0095635 A1* | 4/2018 | Valdivia ................ G06F 3/0482 |
| 2018/0247443 A1* | 8/2018 | Briggs ................ G06V 40/174 |
| 2018/0357817 A1 | 12/2018 | Ikekita |
| 2019/0095918 A1* | 3/2019 | Stewart ................ G06T 19/006 |
| 2019/0349636 A1 | 11/2019 | Watanabe et al. |

(Continued)

FOREIGN PATENT DOCUMENTS

| JP | 2015-184689 A | 10/2015 |
| JP | 6431233 B1 | 11/2018 |

(Continued)

OTHER PUBLICATIONS

Steven Hickson et al., "Eyemotion: Classifying facial expressions in VR using eye-tracking cameras", 2019, IEEE, pp. 1626-1635 (Year: 2019).*

(Continued)

*Primary Examiner* — Clayton R Williams
(74) *Attorney, Agent, or Firm* — Oliff PLC

(57) ABSTRACT

One or more computer processors include (i) a distribution portion that distributes, to a viewing user terminal, information about a video including an animation of a character object of a distribution user, (ii) a receiver that receives a display request for a specified gift transmitted from the viewing user terminal, (iii) an object display device that displays a specified gift object corresponding to the specified gift in the video, based on the display request received by the receiver, (iv) a determination portion that determines whether behavior information of the distribution user or another gift object satisfies a predetermined condition associated with the specified gift object, and (v) an expression portion that changes at least one of a movement and a shape of the specified gift object when the determination portion determines that the predetermined condition is satisfied.

14 Claims, 8 Drawing Sheets

(56) References Cited

U.S. PATENT DOCUMENTS

2022/0060800 A1    2/2022  Kurabuchi
2022/0070513 A1    3/2022  Shirai et al.

FOREIGN PATENT DOCUMENTS

| | | |
|---|---|---|
| JP | 6526898 B1 | 6/2019 |
| JP | 6543403 B1 | 7/2019 |
| JP | 6783919 B1 | 11/2020 |
| WO | 2019/216249 A1 | 11/2019 |

OTHER PUBLICATIONS

Josh Constine, "Facebook announces Horizon, a VR massive-multiplayer world", Sep. 25, 2019, Tech Crunch, pp. 1-5 (Year: 2019).*

Josh Constine, "Facebook animates photo-realistic avatars to mimic VR users' faces", May 2, 2018, Tech Crunch, pp. 1-3 (Year: 2019).*

Micahel Irving, "VR headset that relays facial expressions to the virtual world", News Atlas, Jul. 25, 2016, pp. 1-5 (Year: 2016).*

Sep. 16, 2022 Office Action issued in Japanese Patent Application No. 2020-177123.

May 12, 2020 Office Action issued in Japanese Patent Application No. 2019-238429.

Dec. 20, 2022 Office Action issued in Japanese Patent Application No. 2021-214002.

Dec. 27, 2022 Office Action issued in Japanese Patent Application No. 2021-214000.

Jun. 6, 2023 Office Action in Japanese Patent Application No. 2021-214000.

\* cited by examiner

INFORMATION PROCESSING SYSTEM, INFORMATION PROCESSING METHOD, AND COMPUTER PROGRAM

This application claims the benefit of priority from Japanese Patent Application No. 2019-238429 filed Dec. 27, 2019, the entire contents of the prior application being incorporated herein by reference.

TECHNICAL FIELD

This disclosure relates to an information processing system, an information processing method, and a computer program.

BACKGROUND TECHNOLOGY

Conventionally, an information processing system is known which generates an animation of a character object based on a movement of an actor and distributes a video including the animation of the character object (see, for example, Patent Document 1).

In this type of information processing system, it is proposed to, by an operation of a viewing user, display an arbitrary object in the video. The object displayed in the video by the viewing user is, for example, a gift object or the like.

PRIOR ART REFERENCE

Patent Reference

[Patent Document 1] JP2015-184689A

SUMMARY

Problem to be Resolved

Usually, after the gift selected by the operation of the viewing user falls as a gift object from an upper part to a lower part of a space within the video and is placed at a predetermined position, it is generally displayed in such a manner that the display is finished over time.

Here, because the viewing user's gifting leads to an improvement in a distribution user's motivation to distribute, a problem in this technical field is how to improve a motivation of the viewing user for gifting.

Therefore, an object of this disclosure is to provide a technical improvement that solves or alleviates at least part of the above-described problem of the conventional technology. One of the more specific objects of this disclosure is to provide an information processing system, an information processing method, and a computer program that can improve a motivation of a viewing user for gifting.

Means of Solving Problem

An information processing system according to this disclosure is an information processing system that distributes a video including an animation of a character object generated based on a movement of a distribution user, and comprises one or more computer processors. The one or more computer processors provide (i) a distribution portion that distributes, to a viewing user terminal, information about a video including the animation of the character object of the distribution user, (ii) a receiver that receives a display request for a specified gift transmitted from the viewing user terminal, (iii) an object display device that displays a specified gift object corresponding to the specified gift in the video, based on the display request that has been received by the receiver, (iv) a determination portion that determines whether behavior information of the distribution user or another gift object satisfies a predetermined condition associated with a specified gift object, and (v) an expression portion that changes at least one of a movement and a shape of the specified gift object when the determination portion determines that the predetermined condition is satisfied.

The expression portion can change at least one of the movement and the shape of the specified gift object by reproducing an animation that has been set for the specified gift object, based on the behavior information of the distribution user or the other gift object.

The expression portion can change at least one of the movement and the shape of the specified gift object, triggered by the behavior information of the distribution user or the other gift object.

The expression portion can change at least one of the movement and the shape of the specified gift object in conjunction with the behavior information of the distribution user or the other gift object.

The object display device can display a specified gift object, based on reception of the display request or an instruction by the distribution user.

The other gift object can be a gift object associated with the specified gift object.

The expression portion can gradually end the display of the specified gift object, based on the behavior information of the distribution user or the other gift object.

The specified gift can be an attached gift to decorate eyes or mouth of the character object.

The distribution portion can distribute information about one video including animations of character objects of two or more distribution users to the viewing user terminal. The determination portion can determine whether the behavior information of the two or more distribution users satisfies a predetermined condition associated with the specified gift object. The expression portion can change at least one of the movement and the shape of the specified gift object when the determination portion determines that the predetermined condition is satisfied.

The predetermined condition can be that faces of the character objects generated based on the behavior information of at least two distribution users among the two or more distribution users face each other.

The predetermined condition can be that a distance between the faces of the character objects facing each other is equal to or less than a predetermined value.

The predetermined condition can be that mouths of the character objects facing each other are each opened and closed at predetermined intervals.

An information processing method according to this disclosure is an information processing method in an information processing system that distributes a video including an animation of a character object generated based on a movement of a distribution user and causes one or more computer processors included in the information processing system to execute (i) a distributing step that distributes, to a viewing user terminal, information about a video including the animation of the character object of the distribution user, (ii) a receiving step that receives a display request for a specified gift transmitted from the viewing user terminal, (iii) an object display step that displays a specified gift object corresponding to the specified gift in the video, based on the display request received in the receiving step, (iv) a determining step that determines whether behavior information of the distribution user or another gift object satisfies a predetermined condition associated with the specified gift object, and (v) an expressing step that changes at least one of a movement and a shape of the specified gift object when it is determined in the determination step that the predetermined condition is satisfied.

A computer program according to this disclosure is a computer program for a distribution user terminal included in an information processing system that distributes a video including an animation of a character object generated based on a movement of a distribution user. The information processing system includes the distribution user terminal, a viewing user terminal, and a server device and causes one or more computer processors included in the distribution user terminal to realize (i) a transmission function that transmits, to the server device, information about the video including the animation of the character object of the distribution user, (ii) a reception function that receives a display request for a specified gift transmitted from the viewing user terminal, (iii) an object display function that displays a specified gift object corresponding to the specified gift in the video, based on the display request received by the reception function, (iv) a determination function that determines whether behavior information of the distribution user or another gift object satisfies a predetermined condition associated with the specified gift object, and (v) an expression function that changes at least one of a movement and a shape of the specified gift object when the determination function determines that the predetermined condition is satisfied.

An information processing method according to this disclosure is an information processing method in a distribution user terminal included in an information processing system that distributes a video including an animation of a character object generated based on a movement of a distribution user. The information processing system includes the distribution user terminal, a viewing user terminal, and a server device and causes one or more computer processors included in the distribution user terminal to execute (i) a transmitting step that transmits, to the server device, information about the video including the animation of the character object of the distribution user, (ii) a receiving step that receives a display request for a specified gift transmitted from the viewing user terminal, (iii) an object display step that displays a specified gift object corresponding to the specified gift in the video, based on the display request received in the receiving step, (iv) a determining step that determines whether the behavior information of the distribution user or another gift object satisfies a predetermined condition associated with the specified gift object, and (v) an expressing step that changes at least one of a movement and a shape of the specified gift object when it is determined in the determination step that the predetermined condition is satisfied.

A computer program according to this disclosure is a computer program for a viewing user terminal included in an information processing system that distributes a video including an animation of a character object generated based on a movement of a distribution user. The information processing system includes a distribution user terminal, the viewing user terminal, and a server device and causes one or more computer processors included in the viewing user terminal to realize (i) a reception function that receives, from the server device, information about the video including the animation of the character object of the distribution user, (ii) a display function that displays the video, based on the information about the video received from the server device, and (iii) a transmission function that transmits a display request for a specified gift to the server device. When it is determined that behavior information of the distribution user or another gift object satisfies a predetermined condition associated with the specified gift object displayed in the video based on the display request, the display function changes at least one of a movement and a shape of the specified gift object.

An information processing method according to this disclosure is an information processing method in a viewing user terminal included in an information processing system that distributes a video including an animation of a character object generated based on a movement of a distribution user. The information processing system includes a distribution user terminal, the viewing user terminal, and a server device and causes one or more computer processors included in the viewing user terminal to execute (i) a receiving step that receives, from the server device, information about the video including the animation of the character object of the distribution user, (ii) a display step that displays the video, based on the information about the video received from the server device, and (iii) a transmitting step that transmits a display request for a specified gift to the server device. When it is determined that behavior information of the distribution user or another gift object satisfies a predetermined condition associated with the specified gift object displayed in the video based on the display request, the display step changes at least one of a movement and a shape of the specified gift object.

Effects

According to this disclosure, a technical improvement can be provided that solves or alleviates at least part of a problem of the above-described conventional technology. Specifically, according to a mode of this disclosure, an information processing system, an information processing method, and a computer program can be provided that can improve a motivation of the viewing user for gifting.

BRIEF DESCRIPTION OF DRAWINGS

FIG. 8(*b*) is a conceptual diagram showing an image of a sweet treat object, which is an example of a specified gift object.

MODE TO IMPLEMENT EMBODIMENTS

First, with reference to the drawings, an outline of an information processing system according to a mode of this disclosure will be explained.

An information processing system according to this disclosure is an information processing system that distributes a video including an animation of a character object generated based on a movement of a distribution user, and comprises one or more computer processors.

<System Configuration>

Figure 1:
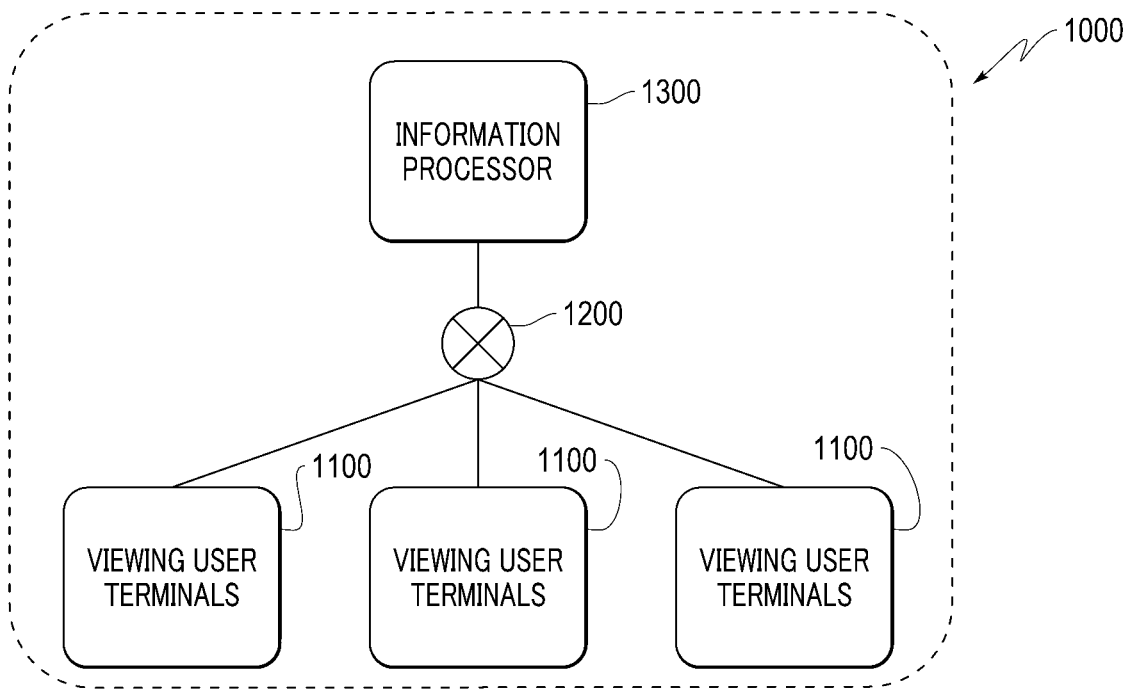
FIG. 1 is a system configuration diagram showing an example of an information processing system according to this disclosure.

As shown as an example in FIG. 1, an information processing system 1000 according to this disclosure includes (i) one or more viewing user terminals 1100, and (ii) an information processor (support computer) 1300, which is connected to these viewing user terminals 1100 via a network 1200 and is arranged in a video distribution studio or the like.

Furthermore, the information processor 1300 may be connected to a server device 1400 (not depicted) via the Internet, and some or all of processing to be performed by the information processor 1300 may be performed on the server device 1400. Additionally, such a server device 1400 may be an information processor 400 shown in FIG. 2.

In this specification, distribution by the information processing system 1000 will be referred to as studio distribution.

In studio distribution, whole body movement of a distribution user (actor) is reflected on a character in real time by capturing a marker(s) attached to the distribution user with a camera installed in the studio using known motion capture technology.

Figure 2:
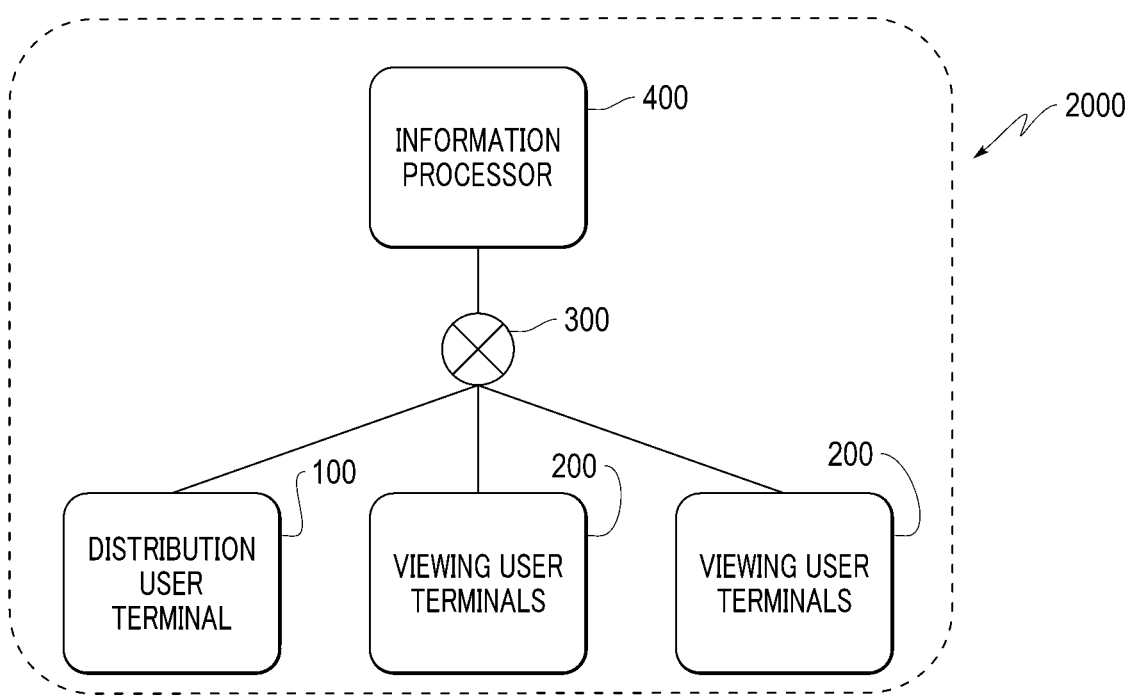
FIG. 2 is a system configuration diagram showing an example of an information processing system according to this disclosure.

Additionally, the information processing system 1000 may work with another information processing system 2000 shown as an example in FIG. 2. The information processing system 2000 shown in FIG. 2 may include a distribution user terminal 100, one or more viewing user terminals 200, and the information processor (server device) 400 connected to the distribution user terminal 100 and the viewing user terminals 200 via a network 300.

In the above example, the distribution user terminal 100 may be an information processing terminal such as a smartphone. In this specification, such distribution by an information processing system 2000 will be referred to as "mobile distribution."

In mobile distribution, movement of a face of the distribution user is captured by a camera of the distribution user terminal 100 and is reflected on a face of a character in real time using known face tracking technology.

As an example, a video generated by the information processing system 1000 and the information processing system 2000 may be distributed to the viewing user from one video distribution platform.

Further, there is no particular distinction between the distribution user and the viewing user in mobile distribution. The viewing user can perform mobile distribution at any time. A distribution user can be a viewing user when viewing a video of another distribution user.

Also, in any distribution, a process of generating an animation by reflecting a motion on the character and a later-described process of displaying a gift may be shared by the distribution user terminal, the viewing user terminals, the information processor, and another device.

Specifically, in the terminal or device that generates an animation of a character object, face motion data and voice data of the distribution user are transmitted from the distribution user terminal. Also, in addition to face motion, body motion may be transmitted.

In the following description, the process of generating an animation is respectively performed by the distribution user terminal and the viewing user terminals, but the process is not limited to this.

In the following description, an information processing system according to this disclosure comprises a system configuration (mobile distribution) shown in FIG. 2. However, the system configuration shown in FIG. 1 may also be provided.

<Hardware Configuration>

Figure 3:
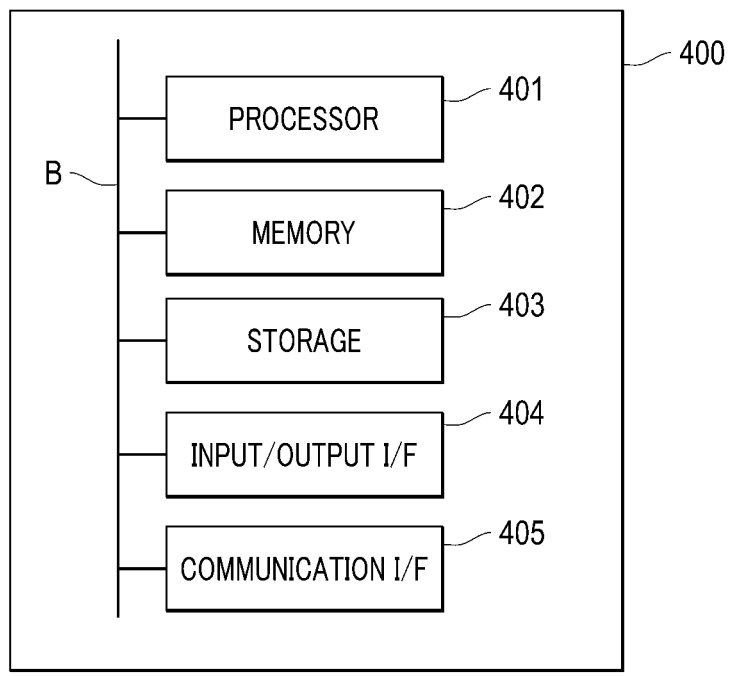
FIG. 3 is a configuration diagram showing an example of a hardware configuration of an information processor according to this disclosure.

Here, with reference to FIG. 3, a hardware configuration of the information processor 400 included in the information processing system 2000 will be described. The information processor 400 includes a processor 401, a memory 402, a storage 403, an input/output interface (input/output I/F) 404, and a communication interface (communication I/F) 405. Each component is mutually connected via a bus B.

The information processor 400 can realize functions and methods described in this mode by the processor 401, the memory 402, the storage 403, the input/output I/F 404, and the communication I/F 405 working together.

The processor 401 executes a function and/or a method implemented by a code or a command included in a program stored in the storage 403. The processor 401 may include, for example, a CPU (Central Processing Unit), an MPU (Micro Processing Unit), a GPU (Graphics Processing Unit), a microprocessor, a processor core, a multiprocessor, an ASIC (Application-Specific Integrated Circuit), an FPGA (Field Programmable Gate Array) or the like, and may realize each process disclosed in each mode by a logic circuit (hardware) or a dedicated circuit formed in an integrated circuit (IC (Integrated Circuit) chip, LSI (Large Scale Integration)) or the like. In addition, these circuits may be realized by one or more integrated circuits. A plurality of processes shown in each mode may be realized by one integrated circuit. Also, depending on the degree of integration, the LSI is sometimes called a VLSI, a super LSI, an ultra LSI, or the like.

The memory 402 temporarily stores a program loaded from the storage 403 and provides a work area for the processor 401. In the memory 402, the processor 401 also temporarily stores various data generated while executing the program. The memory 402 includes, for example, a RAM (Random Access Memory), a ROM (Read Only Memory), or the like.

The storage 403 stores a program. The storage 403 includes, for example, an HDD (Hard Disk Drive), an SSD (Solid State Drive), a flash memory, or the like.

The communication I/F 405 is installed as hardware such as a network adapter, software for communication, and a combination thereof, and sends and receives various data via the network 300. The communication may be wired or wireless, and any communication protocol may be used as long as communication can be performed. The communication I/F 405 performs communication with another information processor via the network 300. The communication I/F 405 transmits various data to the other information processor according to an instruction from the processor 401. Also, the communication I/F 405 receives various data transmitted from the other information processor and transmits the data to the processor 401.

The input/output I/F 404 includes an input device that inputs various operations to the information processor 400, and an output device that outputs a processing result processed by the information processor 400. In the input/output I/F 404, the input device and the output device may be integrated, or the input device and the output device may be separated from each other.

The input device is realized by any of all types of devices that can receive an input from a user and transmit information related to the input to the processor 401, or a combination thereof. The input device includes, for example, (i) a hardware key such as a touch panel, a touch display, or a keyboard, (ii) a pointing device such as a mouse, (iii) a camera (an operation input via an image), or (iv) a microphone (an operation input by voice).

The output device outputs the processing result processed by the processor 401. The output device includes, for example, a touch panel, a speaker, or the like. Furthermore, the information processor 1300, the information processor 400, the viewing user terminals 1100, the distribution user terminal 100, and the viewing user terminals 200 may be configured with a hardware configuration similar to that of FIG. 3, except in special cases.

<Functional Configuration>

Figure 4:
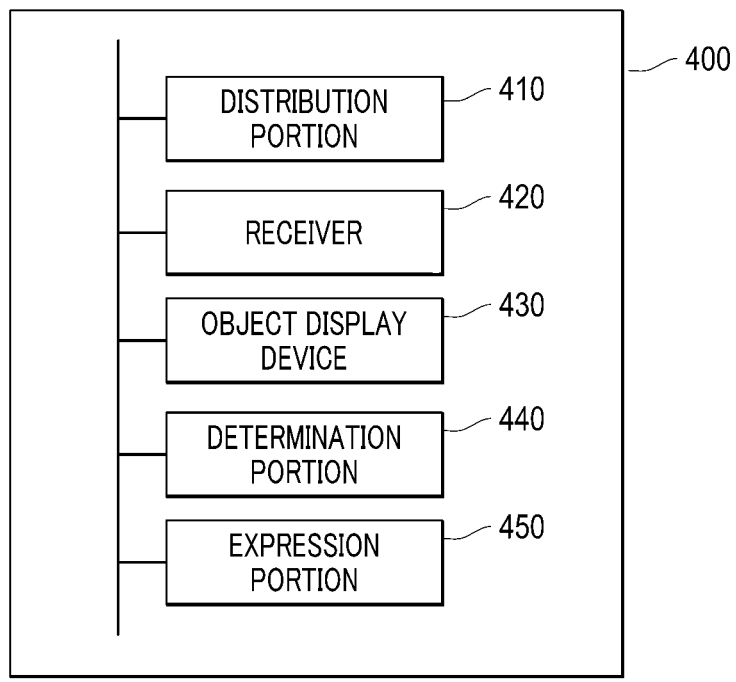
FIG. 4 is a configuration diagram showing an example of a functional configuration of an information processor according to this disclosure.

Additionally, as shown in FIG. 4, the above-mentioned one or more computer processors (the information processor 400 in this example) includes a distribution portion 410, a receiver 420, an object display device 430, a determination portion 440, and an expression portion 450.

The distribution portion 410 distributes information about the video including the animation of the character object of the distribution user to the viewing user terminals 200. The information about the video including the animation of the character object of the distribution user includes, for example, motion information showing motion of the character object, voice information of the distribution user, gift object information showing a gift sent from another viewing user, and the like. Furthermore, the gift object information includes at least (i) gift object identification information that specifies the type of gift object and (ii) position information that shows the position at which the gift object is displayed.

As an example, the distribution portion 410 can perform live distribution of a video via the above-described video distribution platform.

Figure 5:
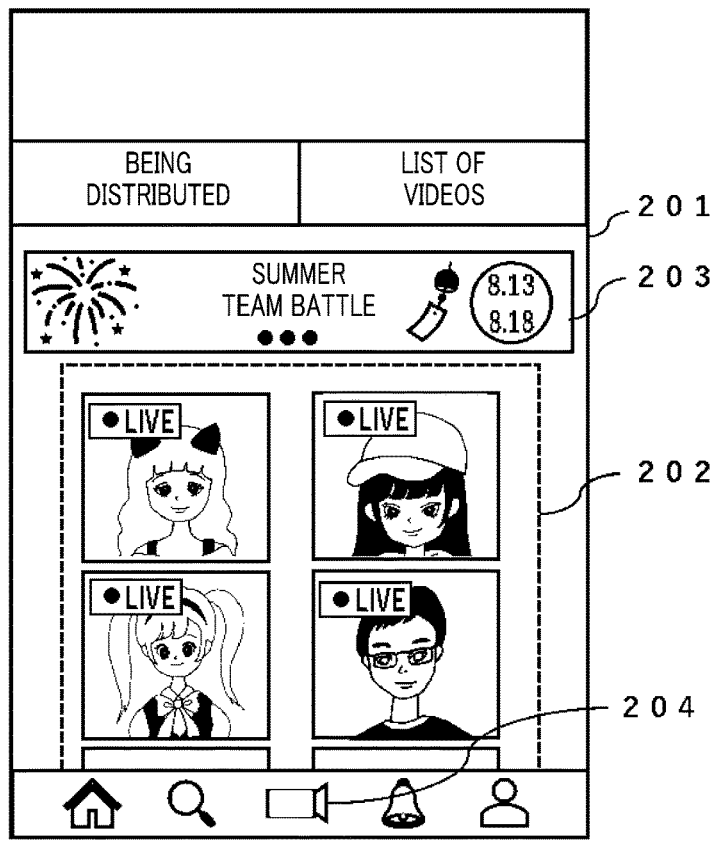
FIG. 5 is a conceptual diagram showing an image of a top screen displayed on a viewing/distribution user terminal.

FIG. 5 shows a top screen 201 displayed on the viewing user terminal 200 of a viewing user who has accessed the above-described video distribution platform.

As shown in FIG. 5, by selecting one distribution channel from the one or more distribution channels 202 displayed in a list on the top screen 201, the viewing user can view the video reproduced on the one distribution channel.

Alternatively, the viewing user can view the video reproduced on the one specified distribution channel by accessing the fixed link of the one specified distribution channel. Such a fixed link can be obtained from a notification from a distribution user who is currently following, a share notification sent from another user, or the like.

As shown in FIG. 5, a display field 203 for notification of a promotion, an event, or the like may be displayed on the top screen 201. This display field 203 for notification may be switched to a display for another notification by a slide operation.

In addition, in the above-described video distribution platform, a list of distribution channels being distributed and a list of distribution channels scheduled to be distributed may be separately displayed by tabs (being distributed/a list of videos). As an example, FIG. 5 shows a list of distribution channels being distributed.

Also, the viewing user can view the video by selecting one distribution channel on the top screen 201. By selecting a distribution button 204, the viewing user can become a distribution user who distributes the video by himself.

Figure 6:
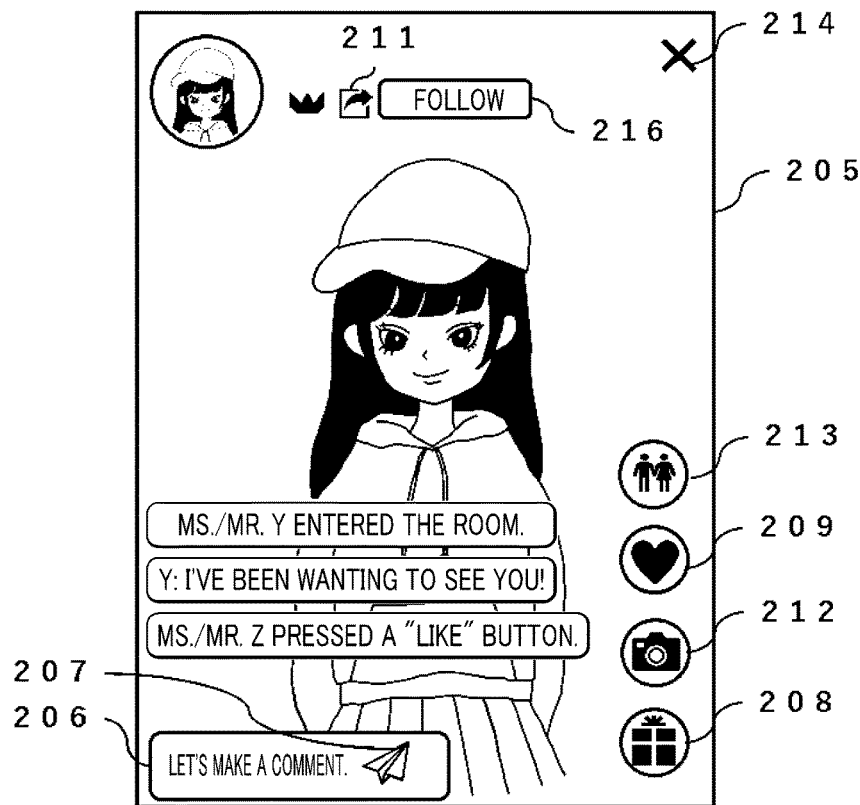
FIG. 6 is a conceptual diagram showing an image of a distribution screen displayed on a viewing user terminal.

FIG. 6 is an example showing a screen 205 of a distribution video displayed on the terminal of the viewing user. The viewing user can post a comment by inputting text in a comment posting field 206 and pressing a send button 207. Also, by pressing a gift button 208, a gift list is displayed to the viewing user, and a gift designated by selection can be posted. In addition, the viewing user can post an evaluation showing favor by pressing a like button 209. Pressing a button includes selecting a button displayed on the screen by tapping or the like.

A "follow" button 216 for the viewing user to follow the distribution user is displayed on the screen of a video distributed by a distribution user that the viewing user has not yet followed. This "follow" button functions as a follow cancel button on the screen of a video distributed by a distribution user who the viewing user has already followed.

This "follow" may be performed from one viewing user to another viewing user, from one distribution user to one viewing user, and from one distribution user to another distribution user. However, "follow" is managed as an association in only one direction, and association in the opposite direction is separately managed as a follower.

Further, regarding the sharing of the video, the viewing user can confirm a list of SNSs (Social Networking Services) that can be shared by pressing a share button 211, and can transmit a fixed link to a designated location of an SNS designated by selection.

Additionally, regarding a still image, the viewing user can save the still image of the screen by pressing a screenshot button 212. Also, by pressing a screen shot button 212, a list of SNSs that can share still images is displayed, and the viewing user can transmit the still images to a designated location of an SNS designated by selection.

Further, by pressing a collaboration button 213, collaborative distribution can be requested to the distribution user.

Collaborative distribution means that the character object of the viewing user is made to appear in the distribution video of the distribution user.

Additionally, a viewing end request can be transmitted by pressing a viewing end button 214 shown in FIG. 6.

Then, the receiver 420 receives a display request for a specified gift transmitted from the viewing user terminal 200. As mentioned above, the display request may include the gift object information. The gift object information includes at least (i) gift object identification information that specifies the type of gift object and (ii) position information that shows the position at which the gift object is displayed.

The object display device 430 displays in the video a specified gift object corresponding to the specified gift, based on a display request received by the receiver 420.

The specified gift is, for example, selected by the viewing user from a list of gifts displayed on the viewing user terminal 200 by pressing the gift button 208, and a display request is made.

Figure 7:
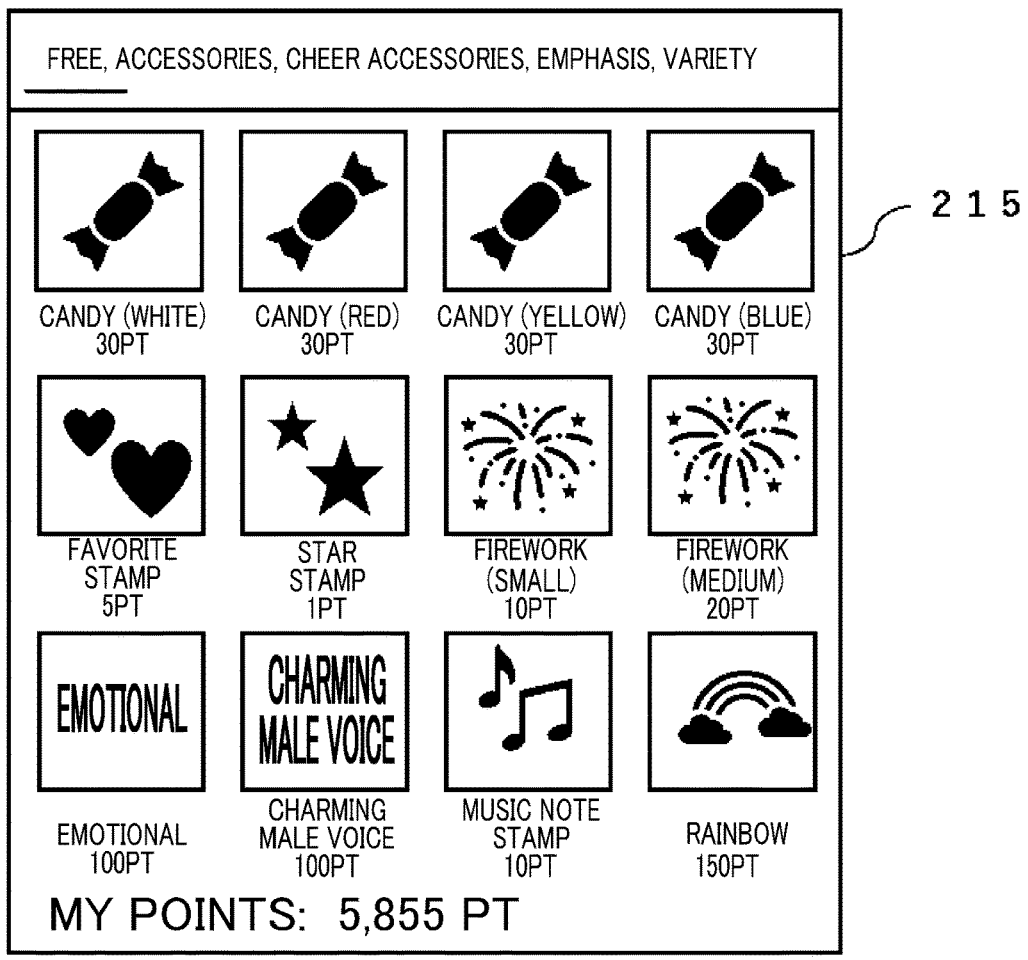
FIG. 7 is a conceptual diagram showing an image of a screen of a list of gifts displayed on the viewing user terminal.

FIG. 7 shows an example of a screen 215 showing a list of gifts displayed on the viewing user terminal 200. As shown in FIG. 7, the gifts may be separated and displayed according to classification (such as free gifts, paid gifts, accessories, cheer accessories, emphasis, and variety).

Here, paid gifts are gifts that can be purchased by spending self-coins purchased by the viewing user, and free gifts are gifts that can be acquired by spending self-points that the viewing user has acquired for free, or without consuming any self-points.

The specified gift is a gift associated with a predetermined condition based on behavior information of the distribution user or another gift object, as described below. As an example, the specified gift object may be a spectacle-shaped object which can be attached by a character object as shown in FIG. 8(a), a food/drink type object representing food or drink as shown in FIG. 8(b), or the like, but this is not limited to these exemplified objects. The example shown in FIG. 8(a) is an animal-shaped spectacle object having wings of a bat or the like, and the example shown in FIG. 8(b) is a stick-shaped sweet treat object.

Then, the determination portion 440 determines whether behavior information of the distribution user or other gift object satisfies a predetermined condition associated with the specified gift object.

The behavior information of the distribution user includes, for example, at least one of (i) information about eye behavior of the distribution user, (ii) information about mouth behavior of the distribution user, (iii) information about body behavior of the distribution user, and (iv) information about voice behavior of the distribution user.

The information about the eye behavior of the distribution user is information specified based on, for example, movement of eyelids or movement of eyeballs of the distribution user.

The information about the mouth behavior of the distribution user is information specified based on, for example, movement of lips or movement of a tongue of the distribution user.

The information about the physical behavior of the distribution user is information specified based on, for example, movement of parts such as the head, neck, shoulders, hands, hips, bottom, and feet of the distribution user.

The information about the voice behavior of the distribution user is information specified based on, for example, a voice generated by the distribution user.

The behavior information of the other gift object is information specified based on, for example, an appearance position or a display position of the other gift object.

Also, the behavior information of the distribution user satisfying a predetermined condition means, for example, that the distribution user has performed a predetermined behavior a predetermined number of times, or the like. The predetermined number of times may be one time, or may be a plurality of times so as to suppress unintentionally satisfying the predetermined condition.

The determination portion 440 can perform the above-described determination by analyzing the information obtained by the above-mentioned motion capture technology, face tracking technology, and/or known voice analysis technology, or the like.

As an example, the object shown in FIG. 8(a) may be associated with the behavior of the distribution user blinking, that is, opening and closing the eyelids, as a predetermined condition.

As an example, the object shown in FIG. 8(b) may be associated with the distribution user's behavior of opening and closing the mouth as the predetermined condition.

On the other hand, the behavior information of the other gift object satisfying a predetermined condition means, for example, that the appearance position or display position of the other gift object approaches a predetermined distance from the display position of the specified gift object; specifically, they are displayed as if the objects were in contact with each other, or the like. The predetermined distance may be appropriately determined according to the size of the objects or the like.

These examples are merely examples, and the predetermined conditions associated with specified gift objects are not particularly limited as long as they can be satisfied by the behavior information of the distribution user or other gift object.

Then, when the determination portion 440 determines that the behavior information of the distribution user or other gift object satisfies the predetermined condition, the expression portion 450 changes at least one of the movement and the shape of the specified gift object.

Changing the movement of the specified gift object includes moving at least part of the object and/or moving part or all of the object.

As an example, in the case of the object shown in FIG. 8(a), the movement is changed by moving the wing portion, which is a part of the object, up and down. According to such an expression, when the distribution user (that is, the character object) blinks, a production is presented such that the wings of the attached bat-shaped spectacles are flapping.

Further, when the number of blinks exceeds a predetermined number of times, the bat portion may be separated and moved upward to create an effect of flying.

On the other hand, changing the shape of the specified gift object includes removing, increasing, decreasing, enlarging, disappearing, or exploding part of the object.

As an example, in the case of the object shown in FIG. 8(b), the shape is changed by removing part of the object. According to such an expression, the distribution user (that is, the character object) opens and closes the mouth to create an effect of the displayed sweet treat being eaten.

Such a food/drink type object may be (i) a non-attaching object that does not attach to the character object, or (ii) an attaching object that is attached near the mouth of the character object. In the latter case, it is possible to more easily express that the character object is eating food and/or drinking.

According to the above configuration, a technical improvement can be provided that solves or alleviates at least part of the problem of the above-described conventional technology. Specifically, according to a mode of this disclosure, a motivation of the viewing user for gifting can be improved.

Further, according to the above configuration, by making some change(s) to the display of the gift(s), the interest of gifting can be enhanced, and the motivation of the viewing user for gifting can be improved.

Additionally, the expression portion 450 may change at least one of the movement and the shape of the specified gift object by reproducing an animation that has been set for the specified gift object based on the behavior information of the distribution user or other gift.

At this time, the animation may be reproduced, triggered by the behavior information of the above-mentioned distribution user or other gift satisfying the above-mentioned predetermined condition.

Figure 8:
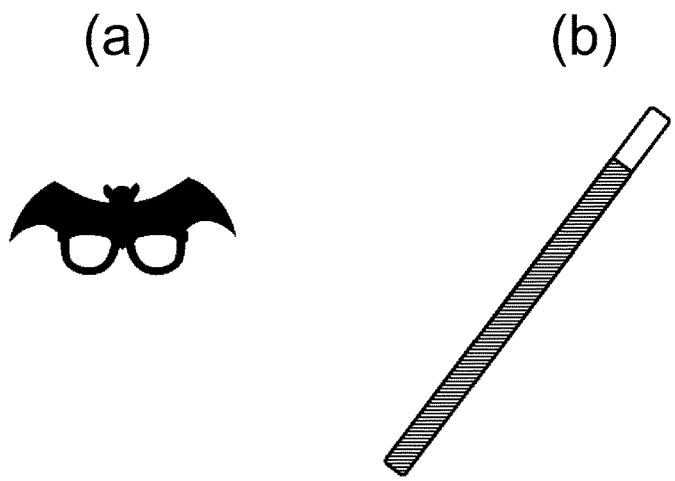
FIG. 8(*a*) is a conceptual diagram showing an image of a spectacle object in a shape of a bat, which is an example of a specified gift object.

As an example, in the case of the object shown in FIG. 8(*a*), when the distribution user (that is, the character object) blinks three times, an animation is reproduced in which the wings of the attached bat-shaped spectacles are flapping.

As an example, in the case of the object shown in FIG. 8(*b*), when the distribution user (that is, the character object) opens and closes the mouth twice, an animation is reproduced in which the displayed sweet treat is gradually decreased.

Alternatively, the expression portion 450 may change at least one of the movement and the shape of the specified gift object in conjunction with the behavior information of the distribution user or other gift.

As an example, in the case of the object shown in FIG. 8(*a*), every time the distribution user (that is, the character object) blinks once, an expression is such that the wings of the attached bat-shaped spectacles are flapping once.

As an example, in the case of the object shown in FIG. 8(*b*), every time the distribution user (that is, the character object) opens and closes the mouth, an expression is such that the displayed sweet treat is reduced.

Further, the object display device 430 can display a specified gift object, based on the reception of the display request or the instruction by the distribution user.

In the former case, objects are displayed in the video in the order in which the display request is received, and in the latter case, objects are displayed in the video in the order instructed by the distribution user. The instruction by the distribution user can be given by selecting display instruction objects displayed on the screen.

The above-mentioned other gift object is preferably a gift object associated with the specified gift object.

The association between the gift objects is realized by storing pieces of gift object identification information included in the gift object information in association with each other.

As an example, if a specified gift object is a food/drink type object, the other object can be chopsticks or a cutlery type object.

With such a configuration, for example, even if a teddy bear object comes into contact with a specified donut-shaped object, the donut does not change at all. On the other hand, when a fork comes into contact with a specified donut-shaped object, an expression is such that the part of the donut is removed, and the character object is eating the donut.

At this time, the expression portion 450 can gradually end the display of the specified gift object, based on the behavior information of the distribution user or other gift.

Gradually ending refers to an expression in which the object eventually disappears due to the donut being removed, a drink being reduced, or fog clearing. Such an expression may be realized by reproducing an animation or replacing a still image.

Additionally, the specified gift can be an attaching gift for decorating the eyes or mouth of the character object.

Specifically, in addition to the above-mentioned spectacles, an eye mask covering the eyes, a mask covering the mouth, or the like can be used.

In the case of the eye mask, the character object is blindfolded, but it is also possible create an effect such that the eyeballs of eyes drawn on the eye mask are moved, or the like, based on the movement of the eyeballs of the distribution user.

Similarly, in the case of the mask covering the mouth, the mouth of the character object is hidden, but it is also possible to create an effect such that a mouth drawn on the mask is moved, or the like, based on the movement of the mouth of the distribution user.

Further, in this configuration, the attaching gift is not limited to decorating the eyes or mouth of the character object. It can also be applied to a hat-shaped gift object attached to the head, accessory-shaped gift object, pet-shaped gift object, or the like.

Next, a case will be described in which the distribution portion 410 distributes, to the viewing user terminal, information about one video including animations of character objects of two or more distribution users.

Figure 9:
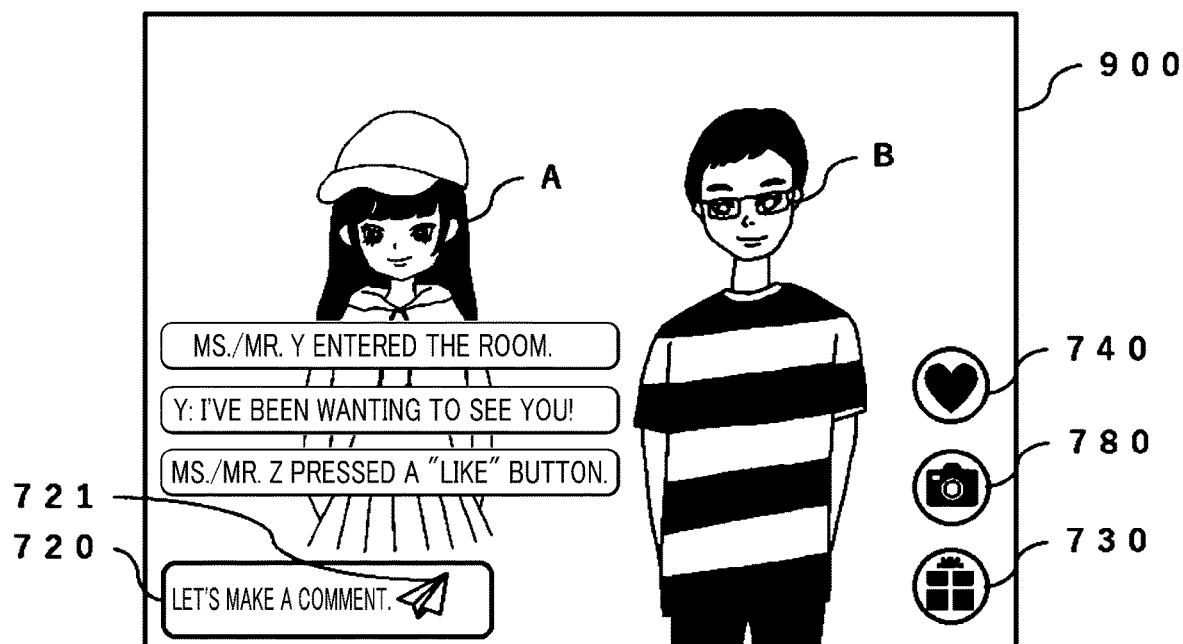
FIG. 9 is a conceptual diagram showing an image of the distribution screen displayed on the viewing user terminal.

One video including animations of character objects of two or more distribution users means a video in which character object A of one distribution user and character object B of another distribution user co-star in one video (hereinafter referred to as "co-starring video"), as shown in FIG. 9.

FIG. 9 is an example of a screen displaying a video in which the character object A and the character object B co-star.

At this time, the determination portion 440 determines whether the behavior information of the two or more distribution users satisfies a predetermined condition associated with the specified gift object.

The predetermined condition may be, for example, that the faces of the character objects generated based on the behavior information of at least two distribution users among the two or more distribution users face each other.

Figure 10:
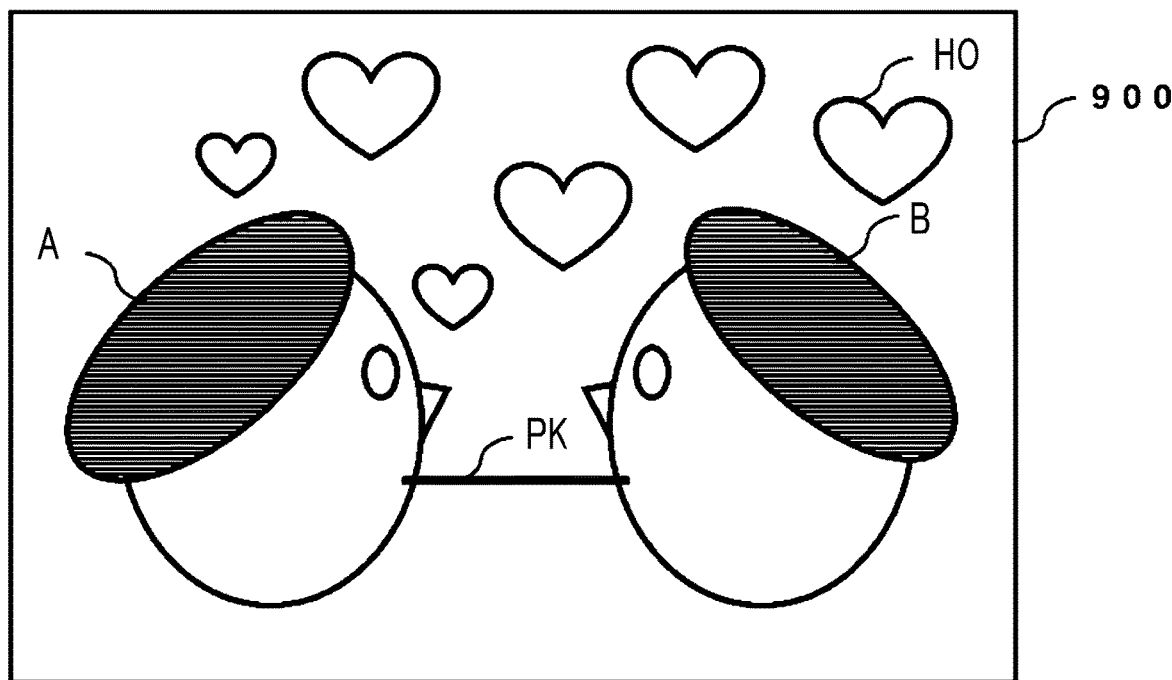
FIG. 10 is a conceptual diagram showing an image of the distribution screen displayed on the viewing user terminal.

FIG. 10 is an example showing a case in which the character object A and the character object B face each other and a predetermined condition is satisfied.

Then, when the determination portion 440 determines that the behavior information of two or more distribution users satisfies the predetermined condition, the expression portion 450 changes at least one of the movement and the shape of the specified gift object.

As an example, as shown in FIG. 10, when the specific object is a stick-shaped sweet treat object PK, the sweet treat object PK is moved to a position at which both ends of the sweet treat object PK are respectively held by the mouth of the character object A and the mouth of the character object B.

Alternatively, the sweet treat object PK may be pre-attached to the mouth of the character object A.

Then, when the character object A and the character object B face each other, an expression is such that the sweet treat object PK is being removed from one end or both ends.

At this time, it is preferable that the distribution users corresponding to the character object A and the character object B adjust the positions of their faces so that the faces of the character object A and the character object B approach each other and kiss.

Further, the predetermined condition may be that the distance between the faces of the character objects facing each other is equal to or less than a predetermined value.

The value of such a distance can be appropriately determined according to the size of the specified gift object.

Further, the predetermined condition may be that the mouths of the character objects facing each other are each opened and closed at a predetermined interval.

Alternatively, the predetermined condition may be that the timing of opening and closing the mouth is the same.

According to such a configuration, in the co-starring video, it is possible to realize effects that cannot be seen in a non-co-starring video. A motivation of the viewing user for gifting can be improved.

Also, when the predetermined condition is already satisfied at the time of a specified gift being gifted and a specified gift object being displayed, and the distance between the faces of the character objects facing each other is equal to or less than the predetermined value, the expression portion 450 can also give an expression such that the speed increases at which the sweet treat object PK is being removed.

Further, the speed at which the sweet treat object PK is being removed may be changed according to the distance between the faces of the character objects facing each other. As an example, the speed increases when the distance is short.

Further, while the predetermined condition is satisfied, another object may be displayed. Such other object may be heart-shaped objects HO displayed around the character object A and the character object B, as shown in FIG. 10 as an example.

Further, in addition to the predetermined condition, another condition may be imposed on the change by the expression portion 450. As an example, it is possible to impose a condition that genders that have been set for the character objects are different.

In addition, instead of the object display device 430 described above, an object attaching portion 460 may be provided. The object attaching portion 460 causes the character object(s) to attach a specified gift object corresponding to a specified gift based on the display request received by the receiver 420.

However, the gift object attached at this time is not displayed immediately, and is displayed when the determination portion 440 determines that the behavior information of the distribution user or other gift object satisfies a predetermined condition.

For example, when a display request for a beam gift for displaying a beam object is received, it is attached to the eye portion of the character object before it is displayed in the video.

After that, when it is determined that the distribution user has the eyes open (that is, when the eyes of the character object are opened), the beam object can be displayed to create an effect as if the beam were being emitted from the eyes.

According to the above configuration, a technical improvement can be provided that solves or alleviates at least part of the problem of the above-described conventional technology. Specifically, according to a mode of this disclosure, a motivation of the viewing user for gifting can be improved.

Further, according to the above configuration, by making some change(s) to the display of the gift(s), the interest of gifting can be enhanced, and the motivation of the viewing user for gifting can be improved.

As an example, at least one of the movement and the shape of the above-described specified gift object being changed is not explicitly stated when the viewing user sends a gift. According to this, it is possible to provide a surprising gifting experience to the viewing user and/or distribution user, rather than a configuration in which a specified gift object corresponding to a specified gift is simply displayed.

Further, according to this disclosure, new communication can be generated between a viewing user and a viewing user, and/or between a viewing user and a distribution user, to guess a change to the gift.

Additionally, according to this disclosure, it leads to various behaviors being performed by a distribution user who has received a specified gift to try to activate a change to the specified gift object, and variations can be created in the content of the video.

Next, an information processing method according to a mode of this disclosure will be explained.

An information processing method according to a mode of this disclosure is an information processing method of the information processing system 2000, as shown in FIG. 2, that distributes a video including an animation of a character object generated based on the movement of the distribution user. The information processing system 2000 includes the distribution user terminal 100, the viewing user terminals 200, and the information processor 400 (server device 400).

Figure 11:
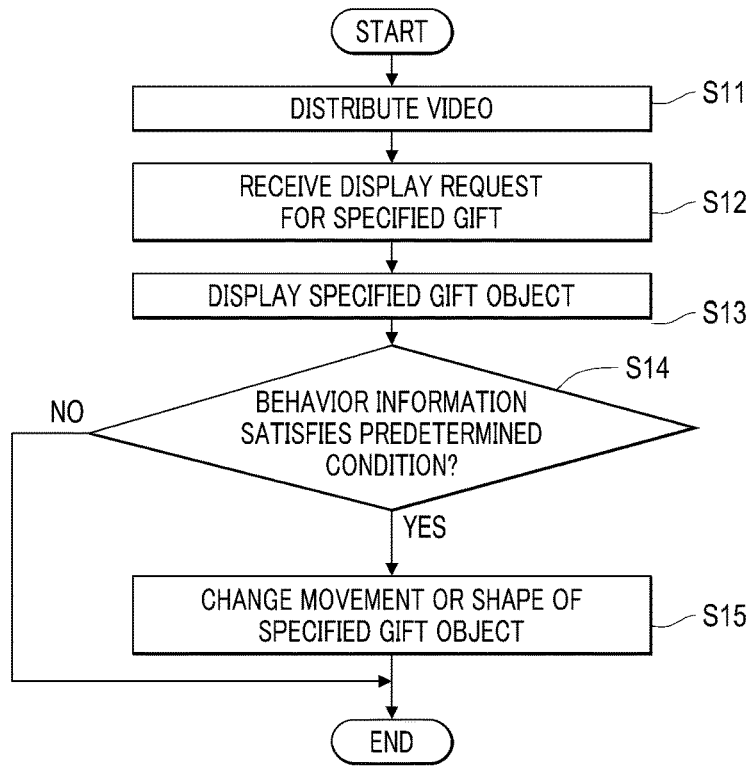
FIG. 11 is a flowchart showing an example of a flow of an information processing method according to this disclosure.

As shown as an example in FIG. 11, an information processing method according to this disclosure causes one or more processors included in the information processing system to execute a distributing step S11, a receiving step S12, an object display step S13, a determining step S14, and an expressing step S15.

In the distributing step S11, information about the video, including an animation of the character object of the distribution user, is distributed to a viewing user terminal. The information can be received from the distribution user terminal. The distributing step S11 can be executed by the above-described distribution portion 410.

In the receiving step S12, a display request for a specified gift that is transmitted from the viewing user terminal is received. The receiving step S12 can be executed by the above-described receiver 420.

In the object display step S13, a specified gift object corresponding to the specified gift is displayed in the video, based on the display request received in the receiving step S12. The object display step S13 can be executed by the above-described object display device 430.

In the determining step S14, it is determined whether the behavior information of the distribution user or other gift object satisfies a predetermined condition associated with the specified gift object. The determining step S14 can be executed by the above-described determination portion 440.

Further, in the expressing step S15, if it is determined in the determining step S14 that a predetermined condition is satisfied, at least one of the movement and the shape of the specified gift object is changed. The expressing step S15 can be executed by the expressing portion 450.

According to the above configuration, a technical improvement can be provided that solves or alleviates at least part of the problem of the above-described conventional technology. Specifically, according to a mode of this disclosure, a motivation of the viewing user for gifting can be improved.

Further, according to the above configuration, by making some change(s) to the display of the gift(s), the interest of gifting can be enhanced, and the motivation of the viewing user for gifting can be improved.

Next, a computer program according to a mode of this disclosure will be described.

A computer program according to a mode of this disclosure is a computer program executed by the information processing system 2000, as shown in FIG. 2, that distributes a video including an animation of a character object generated based on the movement of a distribution user. The information processing system 2000 includes the distribution user terminal 100, the viewing user terminals 200, and the information processor 400 (server device 400).

The computer program according to this disclosure causes one or more processors included in the information processing system to realize a distribution function, a reception function, an object display function, a determination function, and an expression function.

The distribution function distributes information about the video including the animation of the character object of the distribution user to the viewing user terminals.

The reception function receives a display request for a specified gift that is transmitted from the viewing user terminal.

The object display function displays in the video a specified gift object corresponding to the specified gift based on the display request received by the reception function.

The determination function determines whether behavior information of the distribution user or another gift object satisfies a predetermined condition associated with the specified gift object.

If it is determined by the determination function that the predetermined condition is satisfied, the expression function changes at least one of the movement and the shape of the specified gift object.

Figure 12:
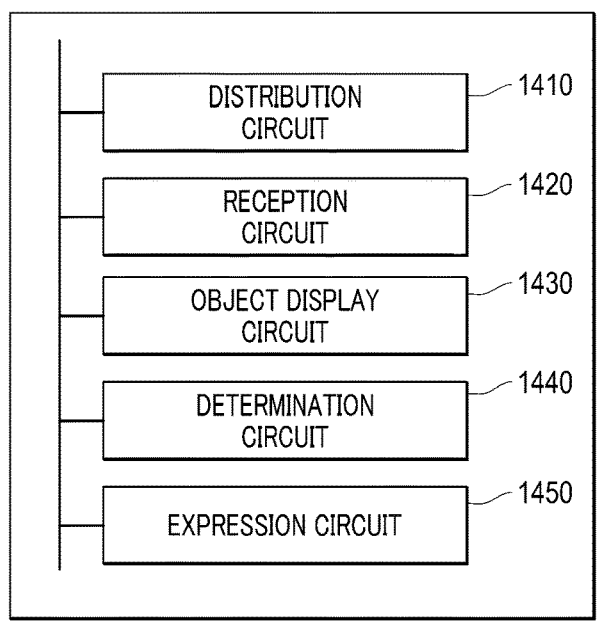
FIG. 12 is a circuit configuration diagram showing an example of a circuit configuration for realizing a computer program according to this disclosure.

The above-described functions can be realized by a distribution circuit 1410, a reception circuit 1420, an object display circuit 1430, a determination circuit 1440, and an expression circuit 1450 that are shown in FIG. 12. The distribution circuit 1410, the reception circuit 1420, the object display circuit 1430, the determination circuit 1440, and the expression circuit 1450 are respectively realized by the above-described distribution portion 410, receiver 420, object display device 430, determination portion 440, and expression portion 450. The details of each component are as described above.

According to the above configuration, a technical improvement can be provided that solves or alleviates at least part of problems of the above-described conventional technology. Specifically, according to a mode of this disclosure, a motivation of the viewing user for gifting can be improved.

Further, according to the above configuration, by making some change(s) to the display of the gift(s), the interest of gifting can be enhanced, and the motivation of the viewing user for gifting can be improved.

Next, a distribution user terminal according to a mode of this disclosure will be explained.

A distribution user terminal 100 according to this disclosure is included in the information processing system 2000, as shown in FIG. 2, that distributes a video including an animation of a character object that is generated based on the movement of a distribution user. The information processing system 2000 further includes the viewing user terminals 200 and the information processor 400 (server device 400).

Figure 13:
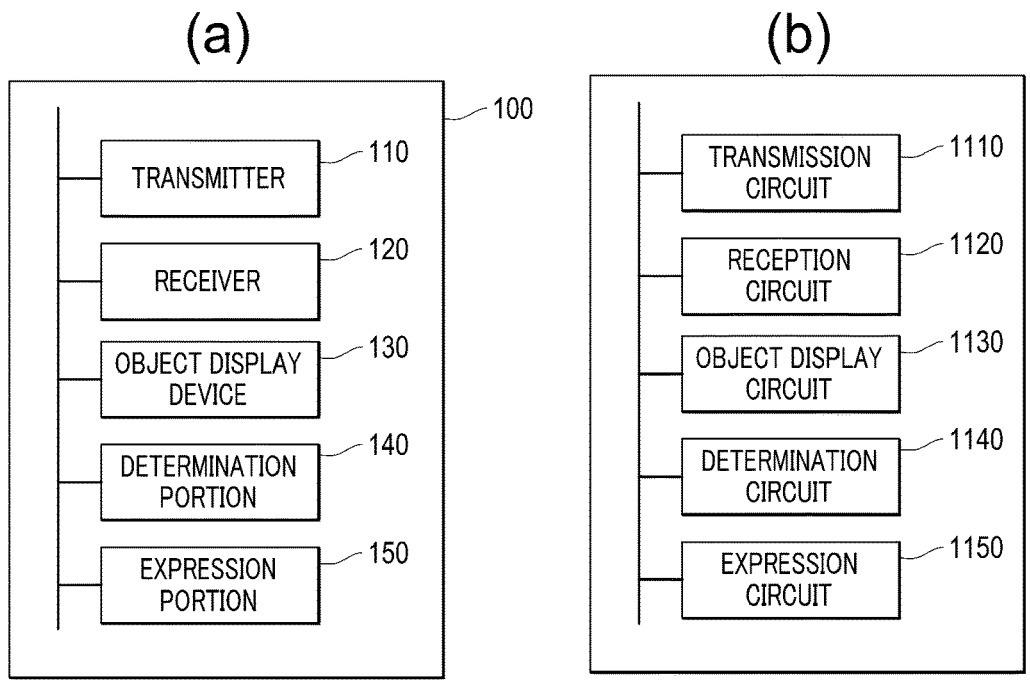
FIG. 13(a) is a configuration diagram showing an example of a functional configuration of a distribution user terminal according to this disclosure.
FIG. 13(b) is a configuration diagram showing an example of a circuit configuration for realizing a function of a program for a distribution user terminal according to this disclosure.

Also, as shown in FIG. 13(*a*), the distribution user terminal 100 includes a transmitter 110, a receiver 120, an object display device 130, a determination portion 140, and an expression portion 150.

The transmitter 110 transmits, to the server device, information about the video including the animation of the character object of the distribution user.

The receiver 120 receives a display request for a specified gift that is transmitted from the viewing user terminal.

The object display device 130 causes a specified gift object corresponding to the specified gift to be displayed in the video based on the display request received by the receiver 120. The object display device 130 may have the same functional configuration as the object display device 430 included in the above-described information processor 400.

The determination portion 140 determines whether the behavior information of the distribution user or another gift object satisfies a predetermined condition associated with the specified gift object. The determination portion 140 may have the same functional configuration as the determination portion 440 included in the above-described information processor 400.

The expression portion 150 changes at least one of the movement and the shape of the specified gift object when the determination portion 140 determines that the predetermined condition is satisfied. The expression portion 150 may have the same functional configuration as the expression portion 450 included in the above-described information processor 400.

According to the above configuration, a technical improvement can be provided that solves or alleviates at least part of the problem of the above-described conventional technology. Specifically, according to a mode of this disclosure, a motivation of the viewing user for gifting can be improved.

Further, according to the above configuration, by making some change(s) to the display of the gift(s), the interest of gifting can be enhanced, and the motivation of the viewing user for gifting can be improved.

Subsequently, a computer program for a distribution user terminal according to a mode of this disclosure will be explained.

A computer program according to this disclosure is a computer program executed by the distribution user terminal 100 that constitutes an information processing system, as shown in FIG. 2, that distributes a video including an animation of a character object generated based on a movement of a distribution user. The information processing system 2000 further includes the viewing user terminals 200 and the information processor 400 (server device 400).

Also, the computer program causes one or more computer processors included in the distribution user terminal to realize a transmission function, a reception function, an object display function, a determination function, and an expression function.

The transmission function transmits, to the server device, information about the video including the animation of the character object of the distribution user.

The reception function receives a display request for a specified gift transmitted from the viewing user terminal.

The object display function displays in the video a specified gift object corresponding to a specified gift based on the display request received by the reception function. The object display function may have the same functional configuration as the object display function realized by the above-described information processor 400.

The determination function determines whether the behavior information of the distribution user or another gift object satisfies a predetermined condition associated with the specified gift object. The determination function may have the same functional configuration as the determination function realized by the above-described information processor 400.

The expression function changes at least one of the movement and the shape of the specified gift object when the determination function determines that the predetermined condition is satisfied. The expression function may have the same functional configuration as the expression function realized by the above-described information processor 400.

The above-described functions can be realized by a transmission circuit 1110, a reception circuit 1120, an object display circuit 1130, a determination circuit 1140, and an expression circuit 1150 as shown in FIG. 13(*b*). The transmission circuit 1110, the reception circuit 1120, the object display circuit 1130, the determination circuit 1140, and the expression circuit 1150 are respectively realized by the transmitter 110, the receiver 120, the object display device 130, the determination portion 140, and the expression portion 150 that are described above. The details of each component are as described above.

According to the above configuration, a technical improvement can be provided that solves or alleviates at least part of the problem of the above-described conventional technology. Specifically, according to a mode of this disclosure, a motivation of the viewing user for gifting can be improved.

Further, according to the above configuration, by making some change(s) to the display of the gift(s), the interest of gifting can be enhanced, and the motivation of the viewing user for gifting can be improved.

Subsequently, an information processing method in a distribution user terminal according to a mode of this disclosure will be explained.

An information processing method according to this disclosure is an information processing method by a distribution user terminal 100 included in an information processing system, as shown in FIG. 2, that distributes a video including an animation of a character object generated based on a movement of a distribution user. The information processing system 2000 further includes the viewing user terminals 200 and the information processor 400 (server device 400).

Figure 14:
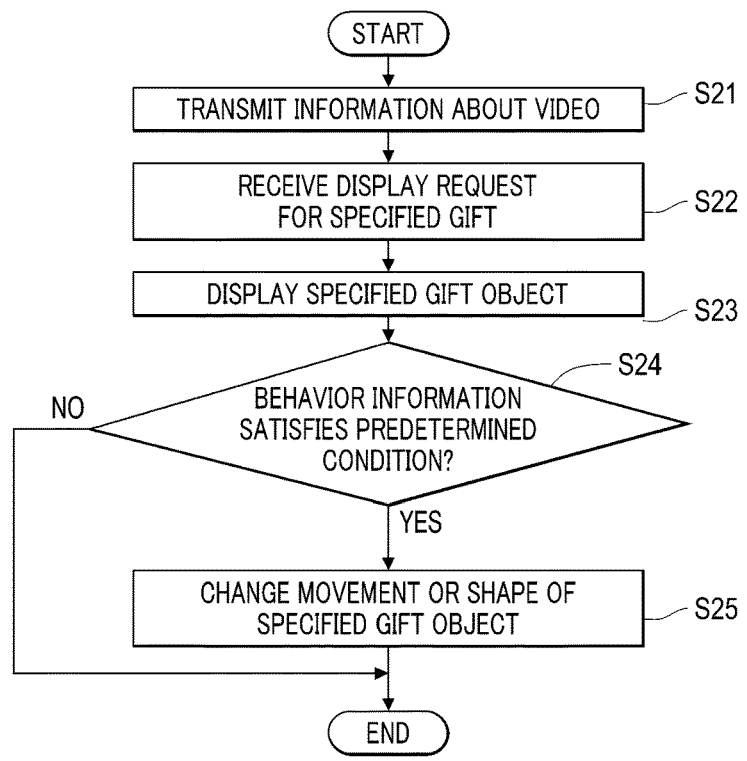
FIG. 14 is a flowchart showing an example of a flow of an information processing method of a distribution user terminal according to this disclosure.

As shown in FIG. 14 as an example, an information processing method according to this disclosure causes one or more computer processors included in the distribution user terminal to execute a transmitting step S21, a receiving step S22, an object display step S23, a determining step S24, and an expressing step S25.

In the transmitting step S21, information about the video including the animation of the character object of the distribution user is transmitted to the server device. The transmitting step S21 can be executed by the above-described transmitter 110.

In the receiving step S22, a display request for a specified gift transmitted from the viewing user terminal is received. The receiving step S22 can be executed by the above-described receiver 120.

In the object display step S23, a specified gift object corresponding to the specified gift is displayed in the video based on the display request received in the receiving step S22. The object display step S23 can be executed by the above-described object display device 130.

In the determining step S24, it is determined whether the behavior information of the distribution user or another gift object satisfies a predetermined condition associated with the specified gift object. The determining step S24 can be executed by the above-described determination portion 140.

In the expressing step S25, if it is determined that the predetermined condition is satisfied in the determining step S24, at least one of the movement and the shape of the specified gift object is changed. The expressing step S25 can be executed by the above-described expressing portion 150.

According to the above configuration, a technical improvement can be provided that solves or alleviates at least part of the problem of the above-described conventional technology. Specifically, according to a mode of this disclosure, a motivation of the viewing user for gifting can be improved.

Further, according to the above configuration, by making some change(s) to the display of the gift(s), the interest of gifting can be enhanced, and the motivation of the viewing user for gifting can be improved.

Subsequently, a viewing user terminal according to a mode of this disclosure will be explained.

A viewing user terminal 200 according to this disclosure is included in the information processing system 2000, as shown in FIG. 2, that distributes a video including an animation of a character object that is generated based on a movement of a distribution user. The information processing system 2000 further includes the distribution user terminal 100 and the information processor 400 (server device 400).

Figure 15:
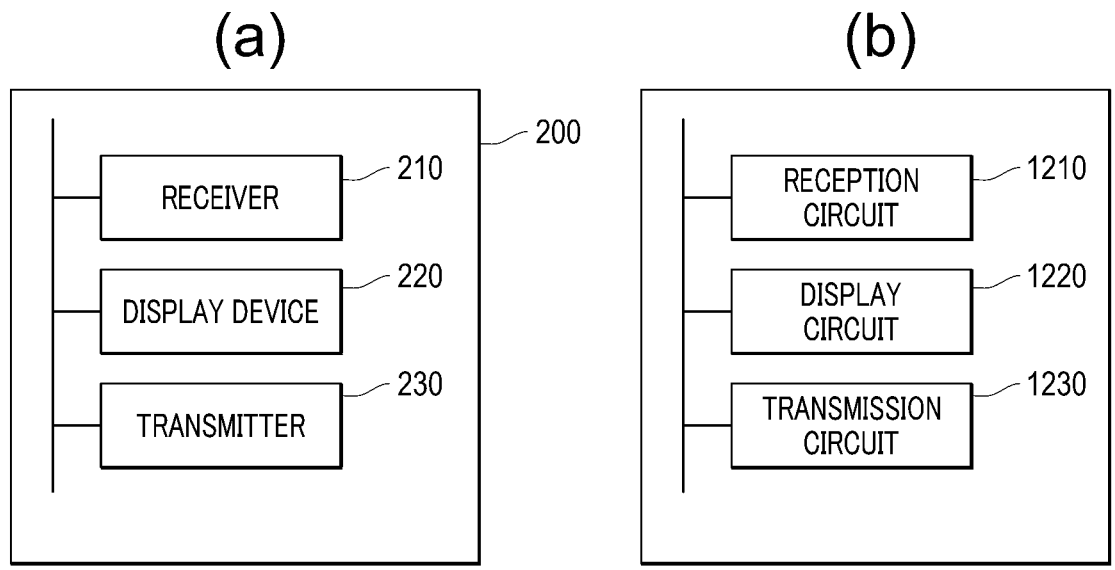
FIG. 15(a) is a configuration diagram showing an example of a functional configuration of a viewing user terminal according to this disclosure.
FIG. 15(b) is a configuration diagram showing an example of a circuit configuration for realizing a function of a program for a viewing user terminal according to this disclosure.

In addition, as shown in FIG. 15(*a*), the viewing user terminal 200 includes a receiver 210, a display device 220, and a transmitter 230.

The receiver 210 receives, from the server device, information about the video including the animation of the character object of the distribution user.

The display device 220 displays the video, based on the information about the video received from the server device.

The transmitter 230 transmits, to the server device, a display request for a specified gift.

Then, when it is determined that the behavior information of the distribution user or another gift object satisfies a predetermined condition associated with the specified gift object displayed in the video based on the display request, the display device 220 changes at least one of the movement and the shape of the specified gift object.

According to the above configuration, a technical improvement can be provided that solves or alleviates at least part of the problem of the above-described conventional technology. Specifically, according to a mode of this disclosure, a motivation of the viewing user for gifting can be improved.

Further, according to the above configuration, by making some change(s) to the display of the gift(s), the interest of gifting can be enhanced, and the motivation of the viewing user for gifting can be improved.

Subsequently, a computer program for a viewing user terminal according to a mode of this disclosure will be explained.

A computer program according to this disclosure is a computer program executed by a viewing user terminal 200 included in the information processing system 2000, as shown in FIG. 2, that distributes a video including an animation of a character object that is generated based on a movement of a distribution user. The information processing system 2000 further includes the distribution user terminal 100 and the information processor 400 (server device 400).

Also, the computer program has a reception function, a display function, and a transmission function in one or more computer processors included in the viewing user terminal(s) 200.

The reception function receives, from the server device, information about the video included in the animation of the character object of the distribution user.

The display function displays the video, based on the information about the video received from the server device.

The transmission function transmits, to the server device, a display request for a specified gift.

Then, if it is determined that the behavior information of the distribution user or another gift object satisfies a predetermined condition associated with the specified gift object displayed in the video based on the display request, the display function changes at least one of the movement and the shape of the specified gift object.

The above functions can be realized by a receiving circuit 1210, a display circuit 1220, and a transmission circuit 1230 that are shown in FIG. 15(b). The reception circuit 1210, the display circuit 1220, and the transmission circuit 1230 are realized by the receiver 210, the display device 220, and the transmitter 230 described above, respectively. The details of each component are as described above.

According to the above configuration, a technical improvement can be provided that solves or alleviates at least part of the problem of the above-described conventional technology. Specifically, according to a mode of this disclosure, a motivation of the viewing user for gifting can be improved.

Further, according to the above configuration, by making some change(s) to the display of the gift(s), the interest of gifting can be enhanced, and the motivation of the viewing user for gifting can be improved.

Subsequently, an information processing method for the viewing user terminal(s) according to a mode of this disclosure will be explained.

An information processing method according to this disclosure is an information processing method by a viewing user terminal 200 included in an information processing system, as shown in FIG. 2, that distributes a video including an animation of a character object that is generated based on a movement of a distribution user. The information processing system 2000 further includes the distribution user terminal 100 and the information processor 400 (server device 400).

Figure 16:
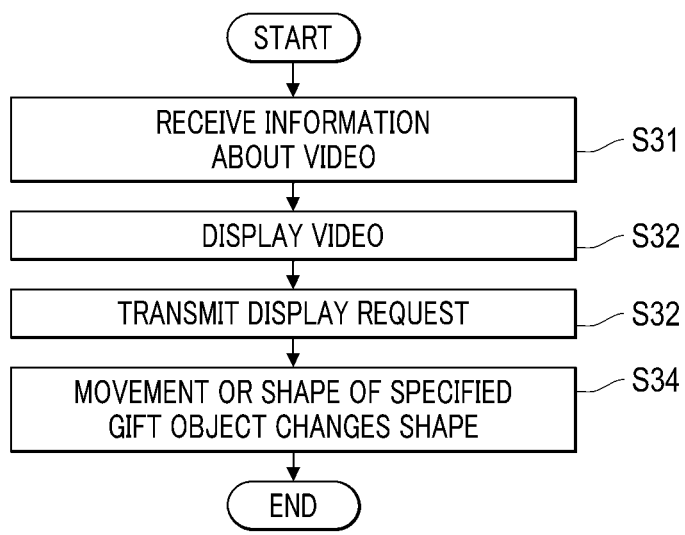
FIG. 16 is a flowchart showing an example of a flow of an information processing method in a viewing user terminal according to this disclosure.

As shown in FIG. 16, an information processing method according to this disclosure causes one or more computer processors included in the viewing user terminal to execute steps S31-S34.

In the receiving step S31, information about the video including the animation of the character object of the distribution user is received from the server device. The receiving step S31 can be executed by the above-described receiver 210.

In step S32, the video is displayed, based on the information received from the server device. The step S32 can be executed by the above-described display device 220.

In step S33, a display request for a specified gift is transmitted to the server device. The step S33 can be executed by the above-described transmitter 230.

In step S34, if it is determined that the behavior information of the distribution user or other gift object satisfies a predetermined condition associated with the specified gift object displayed in the video based on the display request, at least one of the movement and the shape of the specified gift object is changed. The step S34 can be executed by the above-described display device 220.

According to the above configuration, a technical improvement can be provided that solves or alleviates at least part of the problem of the above-described conventional technology. Specifically, according to a mode of this disclosure, a motivation of the viewing user for gifting can be improved.

Further, according to the above configuration, by making some change(s) to the display of the gift(s), the interest of gifting can be enhanced, and the motivation of the viewing user for gifting can be improved.

In addition, an information processor such as a computer or a mobile phone can be preferably used in order to be caused to function as a server device or a terminal device according to the above-described modes. Such an information processor can be realized by (i) storing, in a memory of the information processor, a program describing processing contents for realizing each function of a server device or a terminal device according to the modes, and (ii) reading and executing the program by the CPU of the information processor.

Although some modes have been explained, these modes are presented as examples. Therefore, they are not intended to limit the scope of the disclosure. These novel modes can be implemented in various other forms. Various omissions, replacements, and changes can be made without departing from the gist of the disclosure. These modes and their modifications are included in the scope and gist of the disclosure, and are also included in the disclosure described in the scope of claims and the scope of equivalents thereof.

Furthermore, the methods described in the modes can also be stored in a recording medium, for example, a magnetic disk (a floppy (registered trademark) disk, a hard disk, or the like), an optical disk (a CD-ROM, a DVD, an MO, or the like), a semiconductor memory (a ROM, a RAM, a flash memory, or the like), as programs that can be executed by a computer, and can be transmitted by a communication medium for distribution. The programs stored on the medium side also include a setting program that constitutes, in the computer, software means (including not only an execution program, but also tables and data structures) to be executed by the computer. The computer that realizes this device reads a program recorded in a recording medium. In some cases, it executes the above-described processes by constituting software means by a setting program, and having operations controlled by this software means. The recording medium referred to in this specification is not limited to distribution, but includes a recording medium such as a magnetic disk or a semiconductor memory or the like provided in a device inside a computer or connected via a network. The memory may function as, for example, a main memory device, an auxiliary memory device, or a cache memory.

EXPLANATION OF SYMBOLS

1000 Information processing system
2000 Information processing system
100 Distribution user terminal
200 Viewing user terminal
300 Network
400 Information processor

The invention claimed is:
1. An information processing system that distributes a video including an animation of a character object generated based on a movement of a distribution user, and comprises one or more computer processors, the one or more computer processors comprising:
- a distribution portion that distributes, to a viewing user terminal, information about the video including the animation of the character object of the distribution user;
- a receiver that receives a display request for a specified gift transmitted from the viewing user terminal;
- an object display device that displays a specified gift object corresponding to the specified gift in the video, based on the display request that has been received by the receiver;
- a determination portion that determines whether behavior information of the distribution user or another gift object displayed in the video satisfies a predetermined condition associated with the specified gift object; and
- an expression portion that changes at least one of a movement and a shape of the specified gift object in response to the determination portion determining that the predetermined condition is satisfied.

2. The information processing system according to claim 1, wherein
the expression portion changes at least one of the movement and the shape of the specified gift object by reproducing an animation that has been set for the specified gift object, based on the behavior information of the distribution user or the other gift object.

3. The information processing system according to claim 1, wherein
the behavior information of the distribution user includes at least one of information about eye behavior of the distribution user, information about mouth behavior of the distribution user, information about body behavior of the distribution user, and information about voice behavior of the distribution user.

4. The information processing system according to claim 1, wherein
the behavior information of the other gift object is information specified based on an appearance position or a display position of the other gift object.

5. The information processing system according to claim 1, wherein
the object display device displays the specified gift object in response to reception of the display request or in response to an instruction by the distribution user.

6. The information processing system according to claim 1, wherein
the other gift object is a gift object associated with the specified gift object.

7. The information processing system according to claim 1, wherein
the expression portion ends the display of the specified gift object, based on the behavior information of the distribution user or the other gift object.

8. The information processing system according to claim 1, wherein
the specified gift is an attaching gift to decorate eyes or mouth of the character object.

9. The information processing system according to claim 1, wherein
the distributed video includes animations of character objects of two or more distribution users, which include the character object of the distribution user, to the viewing user terminal;
the determination portion determines whether the behavior information of the two or more distribution users satisfies the predetermined condition associated with the specified gift object; and
the expression portion changes at least one of the movement and the shape of the specified gift object in response to the determination portion determining that the predetermined condition is satisfied.

10. The information processing system according to claim 9, wherein
the predetermined condition is that faces of the character objects generated based on the behavior information of at least two distribution users among the two or more distribution users face each other.

11. The information processing system according to claim 9, wherein
the predetermined condition is that a distance between faces of the character objects generated based on the behavior information of at least two distribution users among the two or more distribution users facing each other is equal to or less than a specified value.

12. The information processing system according to claim 9, wherein
the predetermined condition is that mouths of the character objects facing each other are each opened and closed at specified intervals.

13. An information processing method by an information processing system that distributes a video including an animation of a character object generated based on a movement of a distribution user, the method causing one or more computer processors included in the information processing system to execute:
- a distributing step that distributes, to a viewing user terminal, information about the video including the animation of the character object of the distribution user;
- a receiving step that receives a display request for a specified gift transmitted from the viewing user terminal;
- an object display step that displays a specified gift object corresponding to the specified gift in the video, based on the display request received in the receiving step;
- a determining step that determines whether behavior information of the distribution user or another gift object displayed in the video satisfies a predetermined condition associated with the specified gift object; and
- an expressing step that changes at least one of a movement and a shape of the specified gift object in response to determining in the determination step that the predetermined condition is satisfied.

14. A non-transitory computer-readable medium storing a computer program executed by a viewing user terminal included in an information processing system that distributes a video including an animation of a character object generated based on a movement of a distribution user, wherein the information processing system includes a distribution user terminal, the viewing user terminal, and a server device, the program causing one or more computer processors included in the viewing user terminal to realize:
- a reception function that receives, from the server device, information about the video including the animation of the character object of the distribution user;
- a display function that displays the video, based on the information about the video received from the server device; and
- a transmission function that transmits a display request for a specified gift to the server device, wherein
in response to determining that behavior information of the distribution user or another gift object displayed in the video satisfies a predetermined condition associated with a specified gift object displayed in the video based on the display request, the display function changes at least one of a movement and a shape of the specified gift object.

* * * * *